March 30, 1943.    C. M. JOHNSON    2,314,986
CENTRIFUGAL SEPARATOR
Filed Jan. 14, 1939    2 Sheets-Sheet 1

Charles M. Johnson
By Cushman, Darby, Cushman
Attorneys

March 30, 1943.　　C. M. JOHNSON　　2,314,986
CENTRIFUGAL SEPARATOR
Filed Jan. 14, 1939　　2 Sheets-Sheet 2

Inventor
Charles M. Johnson.
Cushman, Darby & Cushman
Attorneys

Patented Mar. 30, 1943

2,314,986

UNITED STATES PATENT OFFICE 2,314,986

CENTRIFUGAL SEPARATOR

Charles M. Johnson, Washington, D. C.

Application January 14, 1939, Serial No. 251,020

9 Claims. (Cl. 183—77)

The present invention relates to centrifugal separators adapted for various uses and designed particularly for use in cleaning apparatus for separating dust and liquid particles from air.

An object of the invention is the provision of a centrifugal separator adapted for use in cleaning machines of the vacuum cleaner type in which dust-laden air is drawn into the machine and the dust separated out from the air during its passage through the machine. The present invention is particularly adapted to a cleaner of this type, wherein the dust-laden air is initially drawn into contact with a bath of liquid and the dust and liquid then separated from the air and retained in the cleaner while the clean air is discharged from the machine.

In cleaners of this type, I have found that it is difficult to entirely separate the liquid from the air, with the result that liquid will pass into contact with the suction fan, operating motor, and other elements of the cleaner, whose efficiency become impaired when continuously subjected to contact with liquid.

The present invention is designed to eliminate this objectionable feature by providing a centrifugal separator which will efficiently separate the liquid and dust particles from the air, permitting the clean air to be drawn through the machine while the heavier particles are deflected back into the bath of liquid.

Another object is the provision of a plate or disc-like separator having a plurality of circumferentially spaced openings and centrifugally controlled means for sealing and closing the openings when the separator is slowing down or is stationary, thereby providing a further safeguard for preventing the introduction of liquid into contact with the fan and motor.

A further object is to provide a centrifugal separator so constructed that the liquid, air, and dust are all drawn into the separator, and the heavier particles then thrown out to the side and deflected back into the liquid container, while the clean air is drawn through the central part of the machine.

Another object is to provide a centrifugal separator having self-cleaning properties which prevent the wet or damp dust particles, lint, etc. from adhering to the separator and affecting the efficiency of the same.

A still further object is the provision of a fluid cleaning machine of the liquid bath type which is capable of efficient operation, regardless of whether the machine is in a vertical or horizontal position.

With the foregoing and other objects in view, the invention will now be more fully described, reference being had to the accompanying drawings in which.

Figure 1:
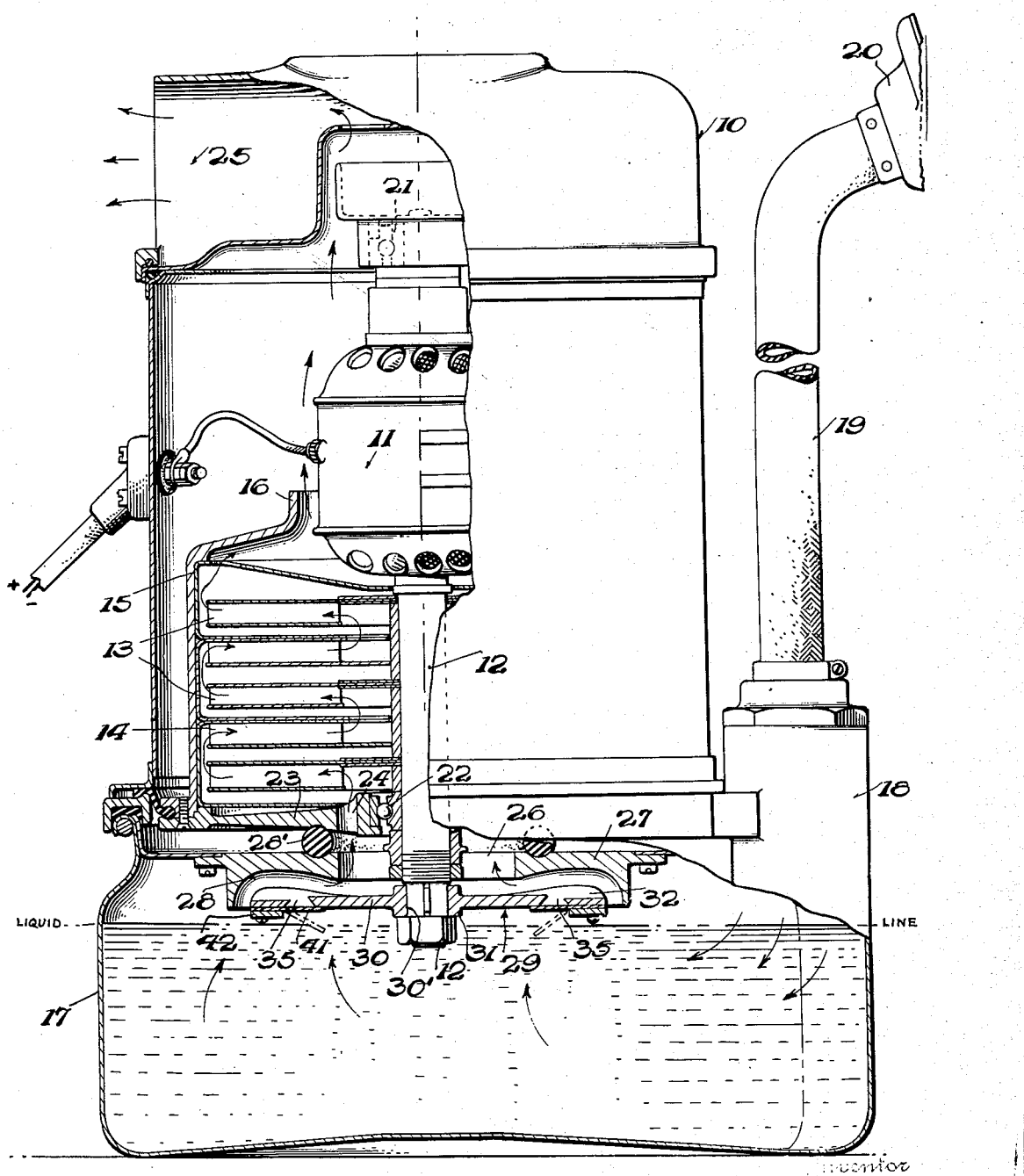
Figure 1 is a side elevation, partly in section, of one form of the invention.

Referring now to the drawings, Figure 1 illustrates one embodiment of the invention comprising a vertically disposed casing or housing 10, within which is centrally mounted an electric motor 11 having a depending rotary shaft 12. To this shaft are connected the movable fan or blade elements of a multiple stage blower 13. This blower may be of any desired construction and is provided with stationary blades 14, which are secured to a blower housing 15. The upper end of this housing terminates in a circular collar 16, which is spaced from the motor 11 to form therewith an annular discharge passage for fluid drawn into the machine by the blower.

At the lower end of the casing 10 is located a liquid receptacle or pan 17, which is preferably detachably connected to the housing to permit the liquid to be changed and replenished as desired. The receptacle 17 is provided with an air inlet 18 to which may be secured a flexible hose 19 having a suction nozzle 20 connected to its free end. A suitable bearing 21 is provided for the upper end of the motor shaft 12, while the lower end of the shaft is journaled in bearing 22, the latter being carried by a bearing plate 23 which is connected to the blower housing 15 and is provided with central air openings 24.

The structure as thus far described may be of any conventional type, the main requisite being that when the blower 13 is in operation, dust-laden air will be drawn through the nozzle 20 and hose 19 into contact with water or other suitable liquid in the receptacle 17. A further requisite is that the plate 23 have the central air openings 24, whereby the clean air will be drawn therethrough and then pass through the annular opening formed by the collar 16, finally discharging out through an air outlet opening 25 located adjacent the top of the casing 10.

Referring still to Figure 1, it will be observed that the lower end of the fan shaft 12 projects down into the upper portion of the liquid receptacle 17 to a point normally above the level of the liquid when the fan and motor are not in operation. This lower end of the shaft 12 projects through a central opening 26 formed in a deflector plate 27 secured to and extending across the top of the liquid receptacle below the bearing plate 23. The lower or under-surface of the deflector is tapered slightly upwardly and outwardly and terminated in a sharp downward curve adjacent the periphery of the plate to form a substantially concave deflecting surface 28. Preferably a circular gasket 28' is clamped between the bearing and deflector plates exteriorly of the central openings 24 and 26, and constitutes a seal to prevent the escape of air outwardly between these plates. To the extreme lower end of the shaft 12 and directly below the deflector 27 is fixed a centrifugal separator 29. This is adapted to rotate at a relatively high speed with the blower 13 when the motor 11 is operated.

Figures 3, 4:
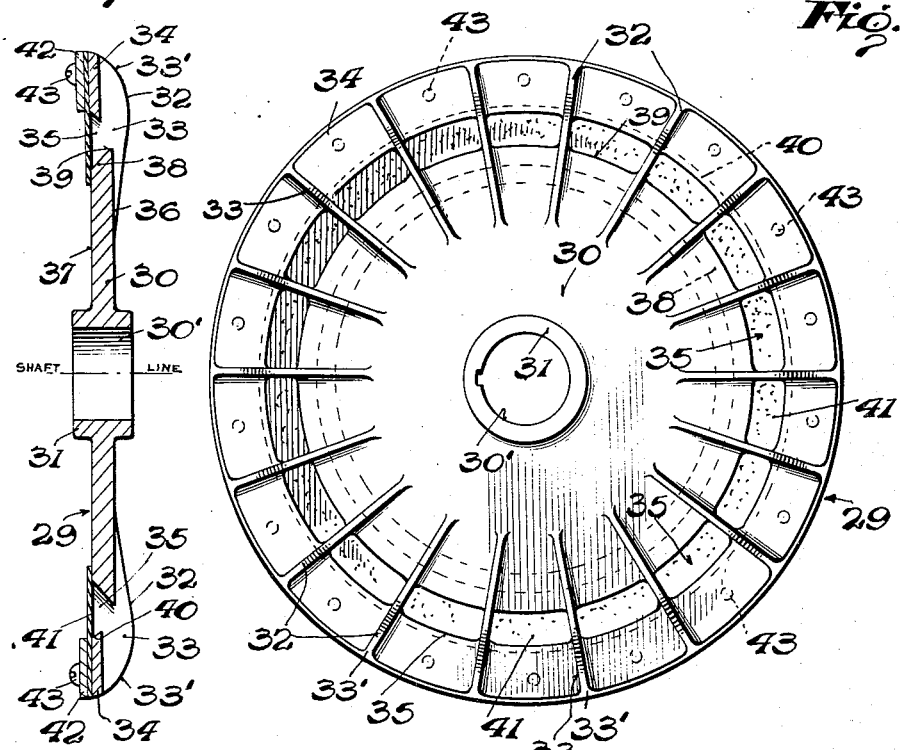
Figure 3 is an enlarged sectional view of the centrifugal separator.
Figure 4 is an enlarged top plan view of the separator.

Referring to Figures 3 and 4, the centrifugal separator is shown in detail and is of substantially plate or disc-like formation, having a solid inner portion 30 which is imperforate except for a central shaft-receiving opening 30'. This opening is surrounded by a hub 31 by which the separator is keyed or otherwise secured to the shaft 12. A plurality of spaced vanes or blades 32 extend radially outward from the solid inner portion 30 of the separator. As will be observed (see Figure 3), each blade 32 is provided with flat impeller faces 33 extending transversely to the plane of the solid inner portion 30 and its upper or discharge edge 33' is tapered gradually upwardly and outwardly from the solid portion 30. The extreme end of each blade is curved downwardly to conform substantially to the curved contour 28 of the deflector plate 27. The outer end portions of the blades are connected by a peripheral ring 34 which cooperates with the blades and solid inner portion 30 to form a plurality of circumferentially spaced openings 35 through which the material to be separated passes.

The blades 32, ring 34, and solid portion 30 of the separator may be formed of separate elements suitably connected together, but, as shown in the drawings, I prefer to mold, cast, or stamp all of these elements to form a one-piece separator unit. As will be observed (see Figure 3), the discharge or outlet face 36 of the solid portion 30 is larger in diameter than its lower or inlet face 37, and these faces are joined at their outer extremities by an upwardly, inclined outer wall 38. This wall 38 and the upper face 36 of the solid portion are joined to each other so as to form a sharp peripheral edge 39 which is uniformly interrupted by the blades 32. The inner face of the ring 34 is also tapered, as at 40, whereby the several elements of the separator form a plurality of upwardly tapered circumferential openings 35. These elements furthermore constitute, by reason of the tapered face 38, a plurality of pockets which have the function of being self-cleaning when the separator is rotated at high speed during the operation of the machine.

While the above described centrifugal separator comprises an operative and efficient structure, I further provide means constituting an automatically actuated sealing element for closing the entrance or intake side of the several openings 35. This means comprises a ring 41 of elastic, rubber-like material, the outer portion of which is clamped to the ring 34 by a second clamping ring 42. Any suitable fastening elements, such as the screws 43, may be utilized to clamp the sealing member 41 between the rings 34 and 42. As shown in Figures 1 and 3, the flexible sealing element 41 extends inwardly and overlaps the peripheral portions of the under-face 37 of the solid portion 30 so as to entirely cover the openings 35 when the separator is either at rest or slowed down to a speed where the centrifugal action is ineffective. However, as shown in dotted lines in Figure 1, when the separator is rotated at a relatively high speed, the centrifugal action will move the free unclamped portions of the sealing element away from the lower surface 37 of the solid portion 29 and thereby uncover the openings 35.

With the construction as above described, and assuming that any suitable liquid, such as water, has been placed in the receptacle or pan 17 to a point somewhat below the shaft 12 and separator 29, the machine is in condition for use as an air or vacuum cleaner. Operation of the motor will rotate the shaft 12 and in turn rotate the blower 13 and separator 29. The operation of the blower creates a suction, thus drawing dust-laden air into the nozzle 20, through the hose 19 and down upon the body of water in the receptacle 17. It is to be understood that the inlet opening 18 is so constructed as to direct the dust-laden air against the surface of the water so that the dust or other foreign particles will be immersed in the water and separated from the air. In actual practice, it has been found that the rotation of the blower and separator agitates and turbulates the air and water sufficiently to produce a spray in the top of the receptacle 17. As the separator 29 is rotated, this spray of air and dust-laden water particles are drawn up through the openings 35. The blades 32 will function to throw the heavier particles of water and dust outwardly against the curved surface 28 of the plate 27, which, in turn, will deflect these heavier particles downwardly and outwardly and return them to the body of water in the receptacle. At the same time, however, the action of the blower 13 will cause the lighter body of clean air to flow upwardly through the central openings 26 and 24 and through the blower casing 15. The clean air will finally pass outwardly through the air outlet 25 of the casing 10 and back into the room or compartment in which the machine is being used.

It is to be understood, of course, that the clean air will become humidified somewhat by its passage through the body of water. However, the construction of the separator 29 is such that the heavy particles of water will be thrown outwardly and will not be permitted to pass through the openings 26 and 24 with the clean air. Furthermore, by reason of the relative width of the openings 35 and the sharp edge formed by the upper surface 36 and the inclined wall 38, there is no opportunity for any particles of water to flow inwardly by capillary attraction. The outwardly inclined or tapered wall 38 also forms with the blades 32, a plurality of pockets which, by reason of the action of the blades on the water, effect a washing action to remove and prevent adherence of any of the particles of dirt or dust to the walls of the openings. In other words, the construction of the separator is such as to produce a self-cleaning action which materially increases the efficiency of the device, since there is no opportunity for the openings to become clogged with dust or lint, etc.

As a further safeguard against injury to the machine, the sealing ring 41 affords no opportunity for particles of water to pass through the central opening 26 into the blower casing. When the separator has slowed down to a point where the centrifugal action of the blades is ineffective to throw the heavier particles of water and dust outwardly, the ring 41 will immediately collapse to a position to close all of the openings 35, and thus shut off the flow of water through the separator. In the drawings the outer wall of the separator is shown spaced somewhat from the curved surface of the deflector. Under actual working conditions this clearance is very small, being only enough to permit the deflected particles to be returned to the receptacle 17. Thus, when the machine is stationary, the flexible ring 41 constitutes a substantial seal against the penetration of liquid into contact with the fan blades and motor. When the machine is moved from place to place, there is no opportunity, therefore, for the dust laden liquid to splash or flow beyond the deflector plate and impair the fan and motor.

It will be apparent, therefore, that the present construction is quite effective in separating dust and other heavier particles from air and that it provides a positive means for preventing the flow of harmful particles of dust and water into contact with the blower and electric motor. Furthermore, by reason of the self-cleaning action of the separator, the machine may be used indefinitely without the necessity of removing and cleaning this element. When it becomes necessary to remove the water or other liquid in the receptacle 17, this may be easily accomplished. Furthermore, by reason of the fact that the separator 29 is detachably connected to the lower end of the shaft 12, this may be quickly removed without the necessity of dismantling the rest of the machine.

While I have designated water as being the particular liquid used in the receptacle 17, it is to be understood that any other desired liquid may be utilized. For instance, a bath of germicidal solution or any liquid containing medicinal properties may be utilized as desired. Furthermore, where it is desired or necessary to remove waterproof types of dust or impurities, any suitable solvent or oil may be used as the liquid bath.

Figure 2:
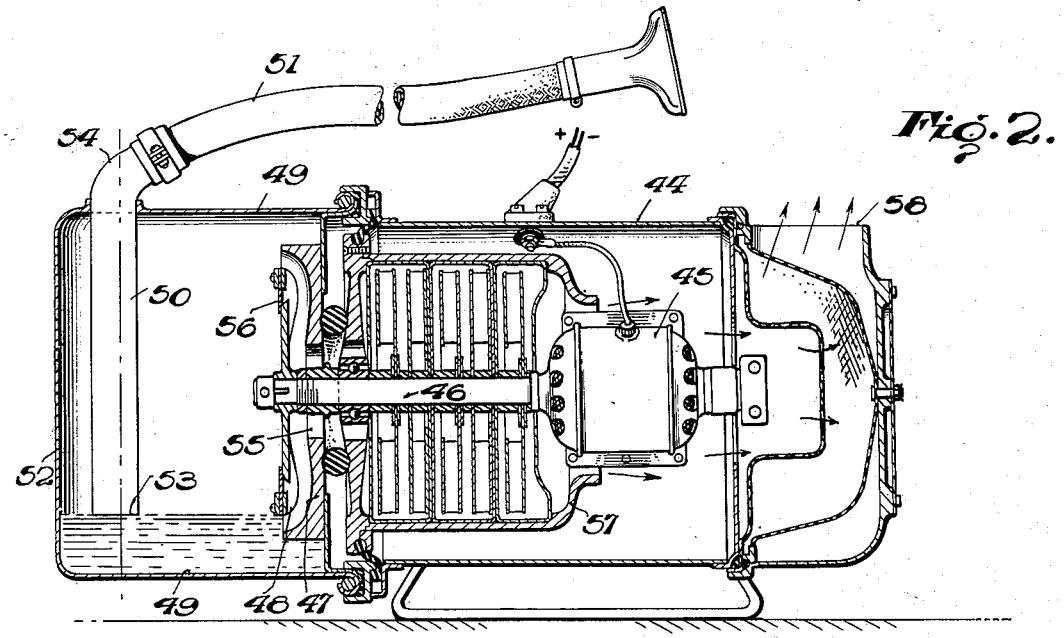
Figure 2 is a section taken through a modified form of the invention.

Referring now to Figure 2, there is disclosed a modified form of the invention which differs primarily from the structure shown in Figure 1, in that the casing 44 is adapted to normally lie in a horizontal plane, although the machine is capable of being operated with the casing in an inclined or vertical position. In this form, the intermediate portion of the casing is cylindrical similar to the casing 10, and the motor 45 and shaft 46 are mounted centrally of the casing, with the shaft normally lying on a horizontal axis. The deflector plate 47 and centrifugal separator 48 are also similar to those described with respect to Figures 1, 3 and 4. The water receptacle 49 is detachably connected to the casing 44 and is provided with an air inlet pipe 50 to which a hose 51 may be detachably secured. This pipe 50 is so constructed and spaced with respect to the end of the receptacle 49, that it will retain the liquid within the receptacle and direct the incoming air into contact with the liquid, regardless of whether the casing is in a horizontal position, as shown in Figure 2, or a vertical or inclined position. The pipe 50 may be arranged in different positions to accomplish this result, but I prefer the arrangement shown in Figure 2, wherein the body of the pipe is substantially straight and extends parallel to the end wall 52 of the liquid receptacle. The outlet 53 of the pipe is closely adjacent but spaced from the end wall 52 as well as the side of the receptacle, so that the incoming dust-laden air will be directed into the body of liquid, regardless of the angle at which the receptacle is positioned. The intake end 54 of the pipe projects through the side of the receptacle and is bent away from the end wall 52, thus preventing the escape of liquid when the casing is resting on the end wall 52. This machine is, therefore, capable of use, regardless of the position in which it is held. It is to be understood, however, that the water level in the horizontal position of the casing should be somewhat below the central air opening 55.

The centrifugal separator 48 operates efficiently regardless of whether it is on a horizontal or vertical axis and the fact that a portion of the separator may be immersed in the liquid will have no effect upon its operating efficiency. In other words, the device will operate to efficiently separate the heavier particles of liquid and dust from the air, regardless of the fact that a portion of the separator is immersed in the water. This is also true of the operation of the sealing ring 56, since the centrifugal action will be sufficient to move the unclamped portion of the sealing member away from the openings in the separator notwithstanding the fact that a small portion of the ring may constantly be in contact with the body of liquid.

The construction shown in Figure 2 operates in the same manner as that of Figure 1, that is, the heavier particles of liquid and dust will be separated from the air and thrown outwardly against the deflector plate 47 and then back into the liquid in the receptacle 49. The clean air will pass through the opening 55, blower casing 57, and finally discharge through the air outlet 58 located at one end of the casing 44.

It will be apparent that the present invention is adapted for operation under conditions that would impair the efficiency of prior art machines if used under similar conditions. In other words, the present device may be efficiently used on aeroplanes, ships, and other conveyances where the conditions are such that it is necessary for the machine to operate efficiently regardless of the angle or inclination at which it is positioned.

In both forms of the invention I have disclosed the separated bearing and deflector plates with their central air openings. It is to be understood, however, that in each instance the bearing plate may be eliminated and the deflector plate rearranged to constitute a bearing as well as deflector plate. In other words, the deflector plate may form the end wall of the blower housing and be provided with a central spider having a bearing ring and air openings.

It is to be further understood that the forms of the invention shown and described are illustrative of the preferred embodiment, and that such changes may be made without departing from the spirit of the invention as fall within the purview of one skilled in the art and the scope of the appended claims.

I claim:

1. A rotatable separating unit having a fluid passage therethrough, and a flexible sealing element carried by said unit and normally closing said passage when said unit is stationary, but adapted to be moved by centrifugal force to uncover said passage when said unit is rotated.

2. A rotatable separating unit having a fluid passage therethrough, and a sealing element of rubber-like material carried by said unit and normally closing said passage when said unit is stationary, but adapted to be moved by centrifugal force to uncover said passage when said unit is rotated.

3. A centrifugal separating unit, comprising a rotatable disc-like member having a plurality of annularly spaced openings through which the material to be separated is adapted to pass, and an elastic sealing ring carried by said member and normally closing said openings when the member is stationary, but being adapted to be moved by centrifugal force to uncover said openings when said unit is rotated.

4. A centrifugal separating unit, comprising a rotatable disc-like member having a plurality of annularly spaced openings through which the material to be separated is adapted to pass, and an elastic sealing ring normally closing said openings when said member is stationary and having its outer edge portion secured to said member, the remaining area of said sealing ring being free to move by centrifugal force to uncover said openings when said member is rotated.

5. A centrifugal separating unit for use in fluid cleaning apparatus, comprising a rotatable member having inlet and outlet faces, and a flexible sealing element mounted on one face of said unit and adapted when said member is stationary to constitute a substantial obstruction to the passage of fluid through said cleaning apparatus, said sealing element upon rotation of said member being adapted to be moved by centrifugal force to render said element inoperative as a sealing medium.

6. A centrifugal separating unit for use in fluid cleaning apparatus, comprising a rotatable member having inlet and outlet faces, and a flexible sealing element mounted on one face of said unit and adapted to control the passage of fluid through the cleaning apparatus, said flexible element upon rotation of said member being adapted to be moved by centrifugal force to render said element inoperative as a sealing medium.

7. A centrifugal separating unit for use in fluid cleaning apparatus, comprising a rotatable member having inlet and outlet faces, and a flexible sealing ring having one peripheral edge portion secured to one face of said member, the remaining area of said sealing ring being free to move relative to said member and control the passage of fluid through the cleaning apparatus, said flexible ring upon rotation of said member being adapted to be moved by centrifugal force to render said ring inoperative as a sealing medium.

8. A centrifugal separating unit for use in fluid cleaning apparatus, comprising a deflector having a centrally disposed opening for permitting fluid to be drawn therethrough, one face of said deflector being substantially concave and constituting a deflecting surface, a rotatable plate-like separator element having inlet and outlet faces, the outlet face being in close proximity to the concave face of the deflector and overlying the central opening in the deflector, a plurality of spaced radial blades mounted on the separator element within the confines of the deflector, and a flexible sealing member mounted on one face of said separator element and adapted when said element is stationary to constitute a substantial obstruction to the passage of fluid through the central opening in the deflector plate, said sealing member upon rotation of said separator element being adapted to be moved by centrifugal force to render said member inoperative as a sealing medium.

9. A centrifugal separating unit for use in fluid cleaning apparatus, comprising a deflector having a centrally disposed opening for permitting fluid to be drawn therethrough, one face of said deflector being substantially concave and constituting a deflecting surface, a rotatable plate-like separator element having a plurality of annularly spaced openings through which the material to be separated is adapted to pass, said openings being located outwardly of the central opening with the deflector and within the confines of the concave surface of the deflector, and a flexible sealing ring carried by said separator element and normally closing said annularly spaced openings when said element is stationary, but being adapted to be moved by centrifugal force to uncover said openings when said element is rotated.

CHARLES M. JOHNSON.